(12) United States Patent
Ho

(10) Patent No.: US 8,316,175 B2
(45) Date of Patent: Nov. 20, 2012

(54) HIGH THROUGHPUT FLASH MEMORY SYSTEM

(75) Inventor: Francis Ho, Palo Alto, CA (US)

(73) Assignee: Inphi Corporation, Santa Clara, CA (US)

( * ) Notice: Subject to any disclaimer, the term of this patent is extended or adjusted under 35 U.S.C. 154(b) by 459 days.

(21) Appl. No.: 12/611,834

(22) Filed: Nov. 3, 2009

(65) Prior Publication Data
US 2011/0107013 A1  May 5, 2011

(51) Int. Cl.
*G06F 12/00* (2006.01)
(52) U.S. Cl. ........................ 711/103; 711/114
(58) Field of Classification Search .................. 711/103, 711/114
See application file for complete search history.

(56) References Cited

U.S. PATENT DOCUMENTS

| | | | |
|---|---|---|---|
| 5,592,612 A * | 1/1997 | Birk | 714/6.24 |
| 6,477,617 B1 | 11/2002 | Golding | |
| 6,993,701 B2 | 1/2006 | Corbett et al. | |
| 2004/0123029 A1 * | 6/2004 | Dalal et al. | 711/114 |
| 2006/0200697 A1 * | 9/2006 | Ito | 714/6 |
| 2010/0199125 A1 * | 8/2010 | Reche | 714/6 |

* cited by examiner

*Primary Examiner* — Jared Rutz
(74) *Attorney, Agent, or Firm* — Richard T. Ogawa; Ogawa P.C.

(57) ABSTRACT

There is disclosed a memory system and method. The memory system may include a plurality of memory planes including two or more data memory areas, and a memory controller adapted to controlling reading, writing, and erasing of the plurality of memory planes. When any one of the data memory areas is occupied with one of a write operation and an erase operation, the controller may reconstruct data stored in the one occupied data memory area by reading parity information and data stored in the plurality of memory areas other than the one occupied data memory area.

19 Claims, 8 Drawing Sheets

HIGH THROUGHPUT FLASH MEMORY SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to nonvolatile memories for use in electronic systems.

2. Description of the Related Art

A flash memory is a type of nonvolatile computer memory, which means that electrical power is not required to maintain the stored data. Flash memory typically offers lower cost for a given storage capacity than other types of solid-state nonvolatile memory devices. Thus flash memory has become the dominant technology for memory cards for digital cameras, USB flash drives, and lower capacity portable media players.

Flash memory device can be electrically read and written. However, only blank memory can be written. Previously written memory cannot be overwritten, but can be electrically erased and then rewritten. One type of flash memory is termed "NAND" flash memory. NAND flash memory can only be written in units composed of a plurality of bytes, commonly called "pages", and can only be erased in even larger units composed of a plurality of pages, commonly called "blocks". Flash memory can also only be read in pages, but some flash memory devices allow read access to smaller units of data, such as individual bytes, after the entire page has been read internal to the flash memory device.

NAND flash memory device typically offer relatively fast read access. Writing and erasing operations may be much slower than read operations. The time to write a page is may be three to ten times as long as a page read operation, and the time to erase a block is typically 70 to 100 times as long as a page read operation. In a conventional flash memory system, a read operation cannot be performed while a write or erase operation is in progress. In many applications, such as digital cameras and media players, relatively slow erase and write times are easily acceptable. In other applications requiring frequent exchange of data to and from the memory, the average throughput of a NAND flash memory may be very low compared to other solid-state memory devices.

Throughout this description, elements appearing in block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Definitions

Throughout this description and the claims, any reference to flash memory or flash memory devices should be understood to be a reference specifically to a NAND flash memory.

Figure 1:
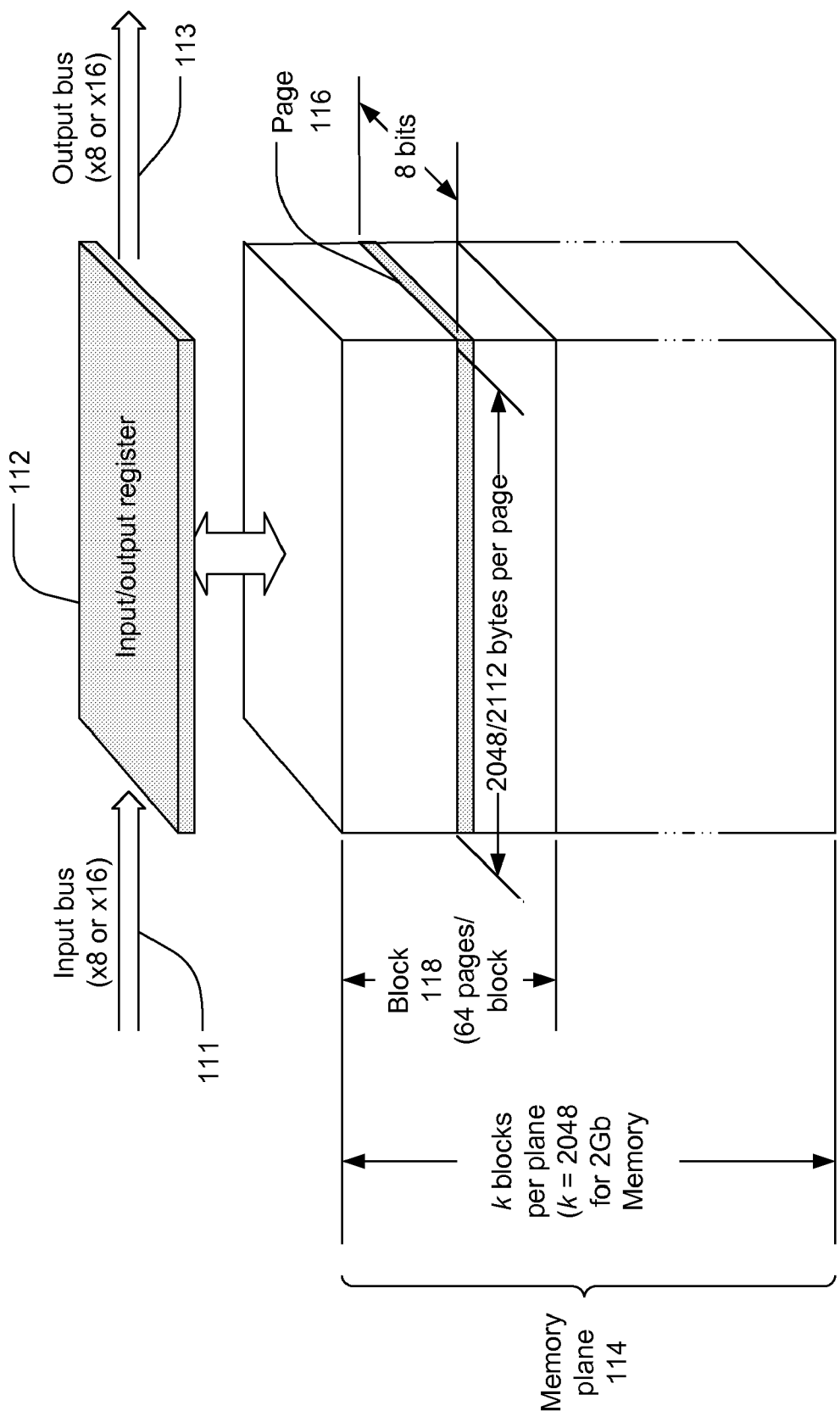
FIG. 1 is a block diagram of a NAND flash memory device.

Referring now to FIG. 1, a memory "plane", such as memory plane 114, is a unit of flash memory accessed using common address and control signals. A memory plane may perform only a single read, write or erase operation at any given time. A memory plane may contain 1 gigabits (Gb), 2 Gb, or some other number of memory bits. A memory plane may be separately accessible, which is to say that a read, write, or erase operation to be performed on one memory plane should not be prohibited by any operation being performed on any other memory plane. A packaged flash memory device may contain one, two, four, or more planes.

A "block", such as block 118, is a subdivision of a plane. A block is the smallest unit of data that may be erased.

A "page", such as page 116, is a subdivision of a block. A page is the smallest unit of data than can be read or written.

Flash memory devices having capacities of less than 1 GB typically use a so-called "small block" architecture where the memory plane is divided into blocks containing 32 pages of 512 data bytes. Flash memory devices having capacities of 1 GB or more typically use a so-called "large block" architecture where the memory plane is divided into blocks containing 64 pages of 2048 data bytes. Other block and pages sizes may be used. FIG. 1 specifically shows a large block flash memory device. Each memory page may also include additional bytes (for example, 16 bytes per small block page or 64 bytes per large block page) that may be optionally used to store an error correcting code (ECC) associated with the page of data.

An "input/output register", such as the input/output register 112, is a mechanism used to transfer a page of data to and from the memory plane in typical flash memory devices. In both the small block and large block architectures, the input/output register may have a capacity equal to one page.

A "data bus" is an interface into and out of the input/output register of a flash memory device. The data bus may include an input bus 111 and an output bus 113, which may be combined into a single bidirectional bus. The data bus may be 8 or 16 bits in width or some other width. The bytes or words of a data page to be written into the flash memory may be transferred into the input/output register 112 sequentially via the input data bus 111. Similarly, the bytes or words of a data page read from the flash memory may be transferred from the input/output register 112 sequentially via the output data bus 113. Multiple memory planes within a single memory chip or package may have independent data buses or may share a common data bus. The data bus may also be used to transfer address values and control signals to a flash memory device.

For example, a currently available large block 2 Gb flash memory device is divided into 2048 blocks. Each block is divided into 64 pages. Each page has a capacity of 2048 8-bit bytes of data plus 64 additional bytes for a total of 2112 bytes. The time required to transfer a page of data from the memory plane to the input/output register is approximately 25 microseconds (µS). The time required to write a page from the input/output register to the memory plane 114 is approximately 300 μS, and the time required to erase a block of 64 pages is approximately 2000 μS. The input/output register and data bus may operate from a clock with a minimum period of 0.03 microseconds, such that the minimum time required to sequentially transfer a page of data into or out of the input/output register is about 64 microseconds. Typically, once a write or erase operation has begun, and until the write or erase operation has completed, a memory plane is unavailable for additional read, write, or erase operations.

Description of Apparatus

Figure 2:
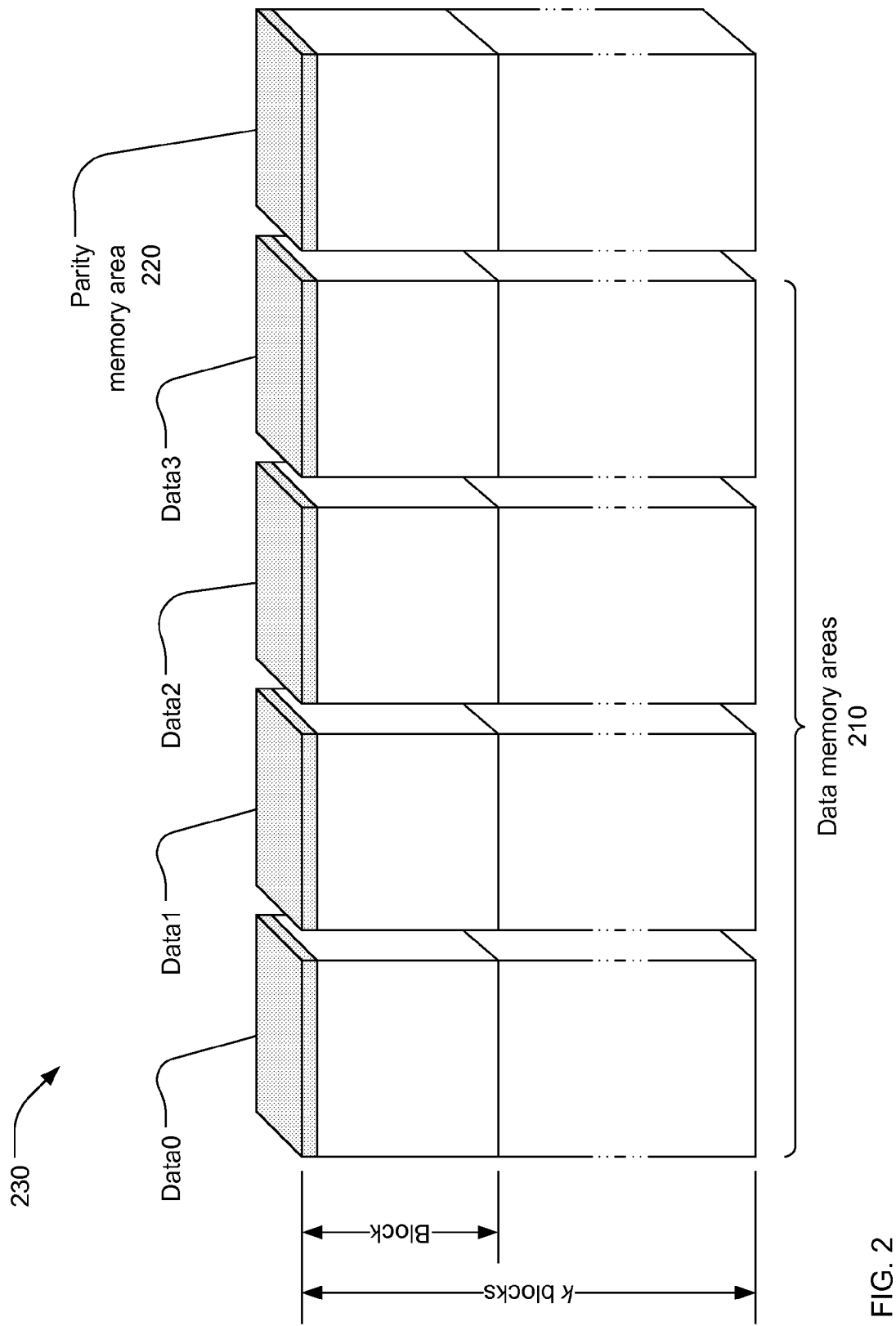
FIG. 2 is a block diagram of a flash memory system.

FIG. 2 is a block diagram of an exemplary flash memory subsystem 230 which may allow high throughput reading concurrently with write and erase operations. The flash memory subsystem 230 may include a plurality of data memory areas 210, and at least one parity memory area 220. Each of these memory areas may be a plane, a portion of one or more planes, a plurality of planes, or some other portion of the flash memory subsystem 230. FIG. 2 specifically shows an exemplary flash memory subsystem 230 having four data memory areas 210 identified as Data0, Data1, Data2, and Data3. A flash memory subsystem 230 may include more or fewer than four data memory areas. Each of the data memory areas Data0-Data3 and the parity memory area 220 may be all or a portion of a flash memory device such as the flash memory device 110. Each of the data memory areas Data0-Data3 and the parity memory area 220 may be divided into blocks and pages as previously described. Each one of the data memory areas Data0-Data3 and the parity memory area 220 may be separately accessible independent of the other memory areas.

Within this patent the term "parity" encompasses any function that derives one or more redundant bits from a plurality of data bits such that one or more missing or corrupted data bits can be recovered from the other bits of the plurality of data bits and the derived one or more redundant bits. The term parity includes single-bit parity schemes such as even parity and odd parity, and multiple-bit parity schemes such as diagonal parity and error correcting codes. Each bit of multiple-bit parity schemes may be stored in a corresponding parity memory area.

Figure 3:
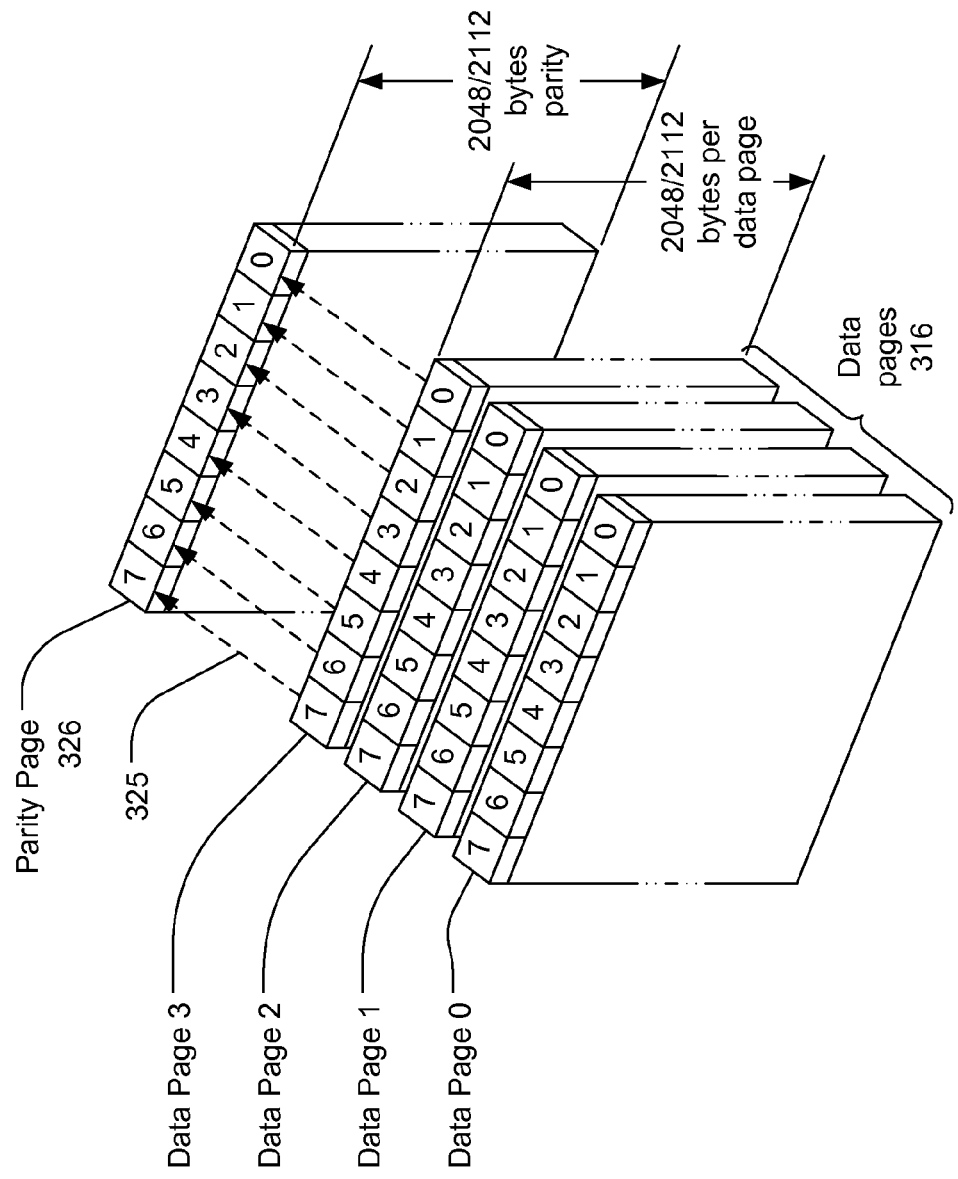
FIG. 3 is a graphical depiction of calculating a page of parity information.

FIG. 3 illustrates the calculation of a parity page 326, which may be a page within the parity memory area 220 containing single-bit parity information relating to a plurality of data pages 316, which may be data pages within the data memory areas Data0-Data1. Each of the plurality of data pages 316 and the parity page 326 is shown as a large block data page with a capacity of 2048 bytes, or optionally 2112 bytes of data. The plurality of data pages 316 and the parity page 326 may also be small block data pages having a capacity of 512, or optionally 528, bytes. The plurality of data pages 316 and the parity page 326 may have some other format common to all of the data and parity pages.

In the example of FIG. 3, Data Page 0, Data Page 1, Data Page 2, and Data Page 3 may be corresponding data pages from respective data memory areas, which may be the data memory areas Data0-Data3 of FIG. 2. The plurality of data pages 316 may correspond in that each data page may have the same page address within its respective data memory area. The parity page 326 may have the same capacity as one of the data pages 316. Each bit in the parity page 326, such as parity bit 325, may be determined from the four corresponding bits in the plurality of data pages 316.

For example, each bit in the parity page 326 may be determined to provide "odd parity", such that the total number of "ones" between the parity bit and the corresponding bits in the plurality of data pages 316 is an odd number (1, 3, or 5). An "odd parity" bit may be derived as the exclusive NOR of the corresponding bits in the plurality of data pages 316. Alternatively, each bit in the parity page 326 may be defined to provide "even parity", such that the total number of "ones" between the parity bit and the corresponding bits in the plurality of data pages 316 is an even number (0, 2, or 4). An "even parity" bit may be the exclusive OR of the corresponding bits in the plurality of data pages 316. The parity may be determined by applying other functions to the corresponding bits in the plurality of data pages 316.

Parity information may be advantageously used to reconstruct missing data. Assume that parity page 326 stores even parity information corresponding to the data stored in Data Pages 0-3. The data stored in any one of the data pages may then be reconstructed by reading the other three data pages and the parity page. For example, assume that the memory area containing Data Page 0 is occupied by a write operation, an erase operation, or some other operation. The data stored in Data Page 0 can still be "read" by reading Data Pages 1-3 and the parity page 326, and then calculating the total number of "ones" at each bit position. If the total number of "ones" at a bit position is an even number, the corresponding bit in Data Page 0 is a "zero". If the total number of "ones" at a bit position is an odd number, the corresponding bit in Data Page 0 is a "one". The data stored in Data Page 0 can be reconstructed, or "read", essentially by calculating the parity of the other four pages.

Data Page 0, Data Page 1, Data Page 2, Data Page 3, and the parity page 326 are an example of a "parity group", where a parity group is defined as a plurality of data pages and a corresponding parity page. The data and parity pages comprising a parity group will be referred to herein as the "members" of the parity group. In order to reconstruct one of the data pages in a parity group from the information stored in the other pages of the parity group, it is necessary that the data in the parity page be current and accurate. Thus a write operation to a data page in a parity group may be accompanied by an associated write operation to the corresponding parity page. A write or erase operation to a parity group may be atomic, which is to say all members of a parity group may be written or erased in a single extended operation that is completed before any other read, write or erase operation to any member of the same parity group is attempted.

To perform an atomic write operation of a parity group, data to be written may be queued until at least one page of data for each of the data memory areas Data0-Data3 is available. The data to be written may be queued until an integer number of pages are available for each of the data memory areas. All of the data pages and the associated parity pages in one or more parity groups may then be written. The architecture of a memory system may allow all of the pages of a parity group to be written concurrently, which would preclude reading any data from the memory areas containing the parity group. In order to be able to reconstruct the data from the memory areas containing the parity group, the atomic write or erase of a parity group may be performed so that, at any one time, no more than one data or parity memory area within the parity group is occupied by the write or erase operation. More than one data or parity memory areas may be occupied by the write or erase operation in a memory system using a multiple-bit parity scheme.

Referring back to FIG. 2, the four data memory areas Data0-Data3 and the parity memory area 220 may store a plurality of parity groups, each of which is composed of a page of data in each of the four data memory areas Data0-Data3 and a corresponding page of parity data. When any one of the data memory areas Data0-Data3 is occupied by a write or erase operation, data cannot be read from that memory area until the write or erase operation is complete. However, as previously described, atomic write and erase operations may be performed such that only one of the memory areas is occupied by a write or erase operation at any given time. Since each of the data memory areas Data0-Data3 and the parity memory area 220 are separately accessible, a page of data from the occupied data memory area may be reconstructed from data read from the corresponding pages in the same parity group.

Continuing the previous example, when a request is received to read a data page from a data memory area that is currently occupied by a write or erase operation, rather than wait as long as 300 µS or 2000 µS respectively, four read operations may be performed to read the other pages of the parity group containing the desired data page. The desired data page may then be reconstructed from the data read from the corresponding pages in the parity memory area and the other three data memory areas. Even if the four read operations are performed sequentially, the desired data page may be reconstructed in less time than the time required for a write or erase operation to complete.

Additionally, a page of data read from one of the data memory areas Data0-Data3 may be, on occasion, corrupted such that the data cannot be recovered using the ECC associated with the data. In this case the desired data page may be reconstructed from data read from the corresponding pages in the parity memory area and the other three data memory areas.

The exemplary flash memory subsystem 230 of FIG. 2 included, for ease of discussion, an isolated single-bit parity memory area 220. A flash memory system may distribute parity pages between a plurality of memory areas such that the parity page of a specific parity group may be stored in any predetermined one of the plurality of memory areas. Flash memory systems for use in applications that require a very high level of data security or availability may incorporate a multiple-bit parity scheme to enable reconstruction of data when two memory areas are simultaneously occupied.

Figure 4:
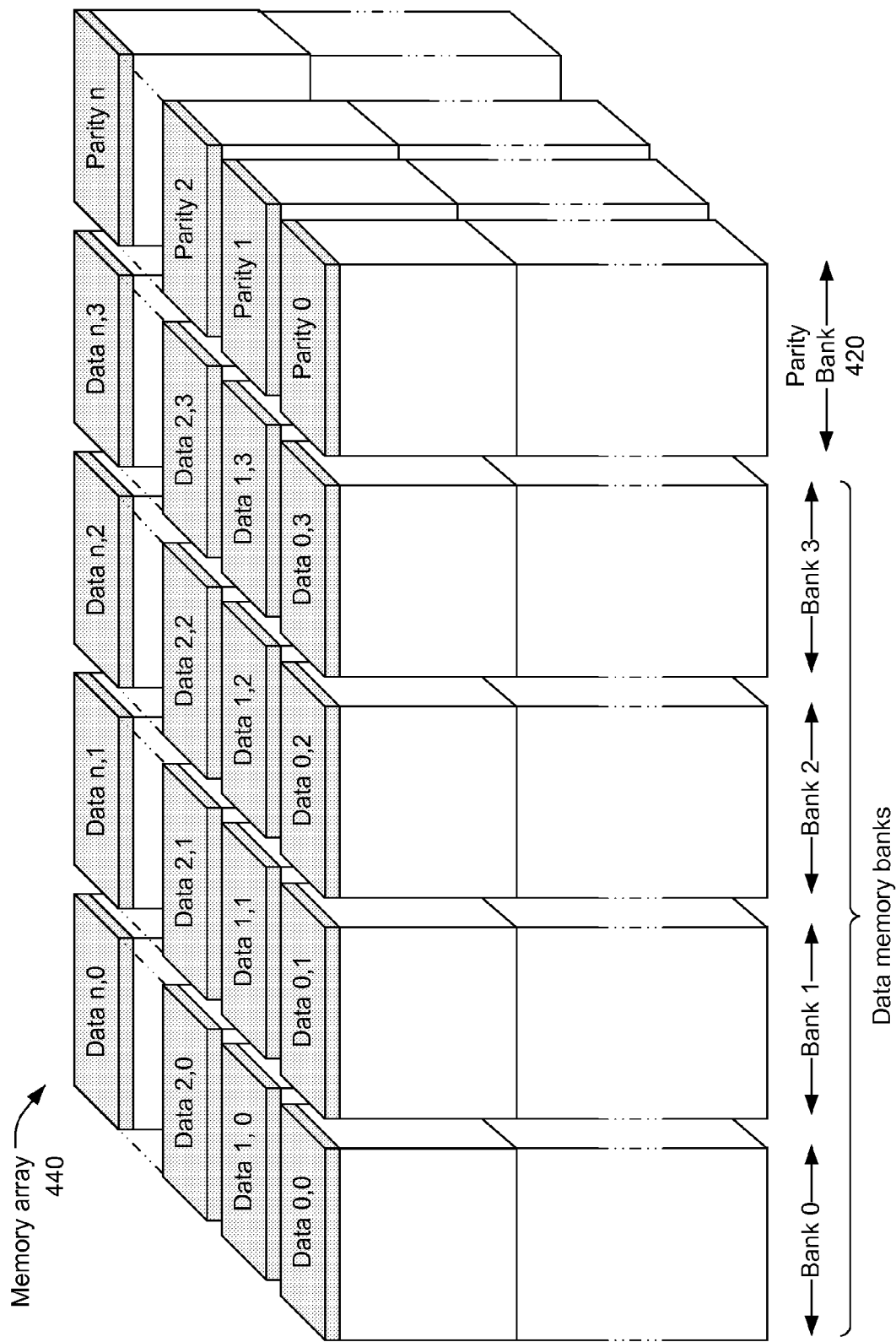
FIG. 4 is a block diagram of a flash memory system.

FIG. 4 shows a block diagram of an exemplary large flash memory array 440, which may include four data banks 410, identified as Bank 0, Bank 1, Bank 2, and Bank 3, and a Parity Bank 420. Each of the four data banks 410 and the parity bank 420 include a plurality of n memory planes. Each memory plane may be divided into blocks and pages as previously described.

Each row of the flash memory array 440, comprising corresponding planes from Bank 1, Bank 2, Bank 3, and Bank 4 and the parity bank, may form a parity subsystem including a plurality of parity groups which function as described in conjunction with FIG. 2. The memory subsystem 230 of FIG. 2 may be recognized as a specialized case of the memory array 440 in which each bank is a single data memory area. In FIG. 4, each of the data memory planes (Data 0,0-Data n,3) may belong to exactly one bank and to exactly one parity subsystem. Each page in the data memory planes (Data 0,0-Data n,3) may belong to exactly one parity group.

The memory array 440 may be operated such that the planes within each bank are operated in parallel. In this case, the smallest unit of data that may be erased in the memory array 440 may be one block in each of the memory planes within a given bank. The smallest unit of data that may be read from or written into the memory array 440 may be one page for each plane within a bank.

Figure 5:
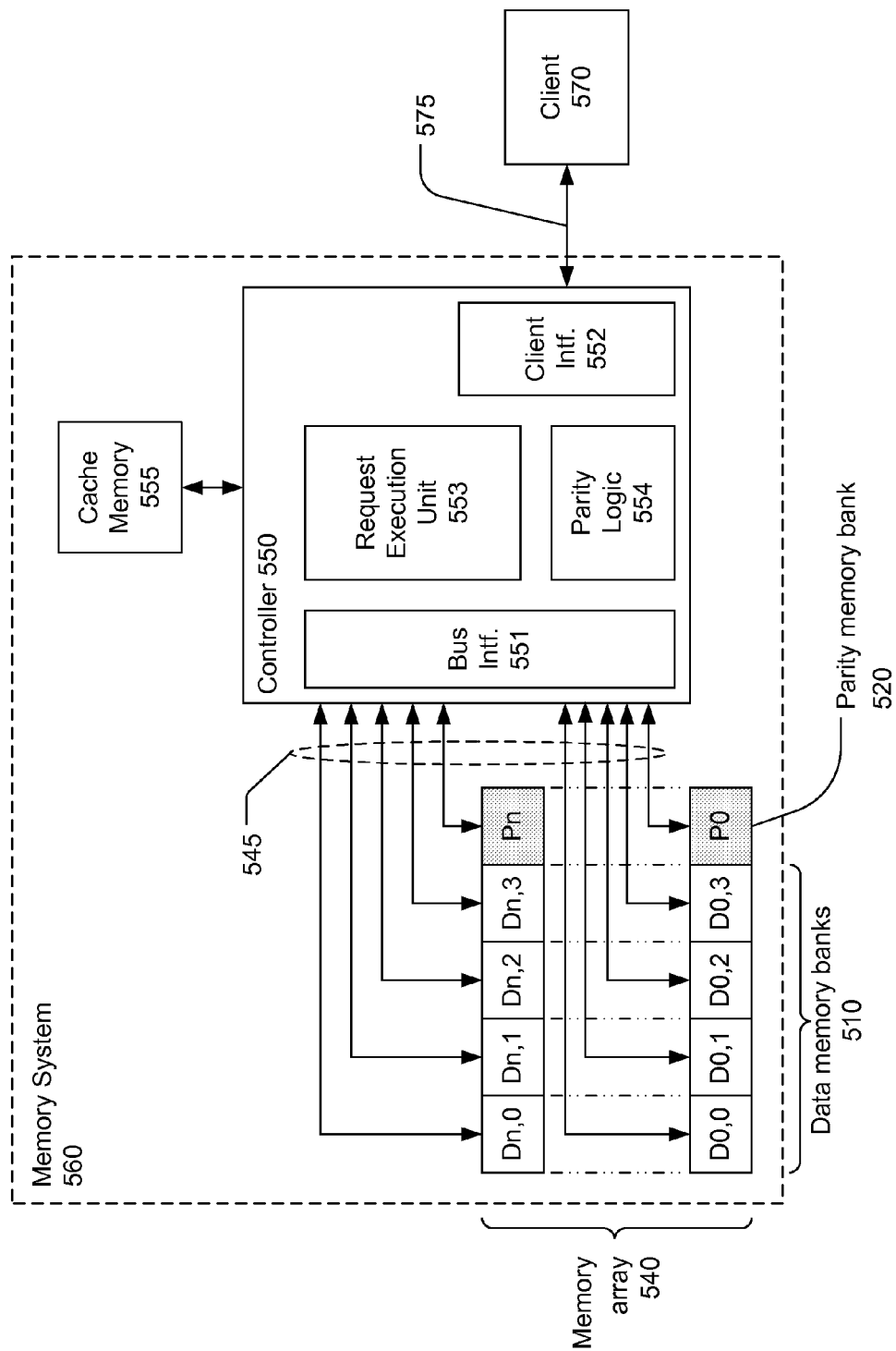
FIG. 5 is a block diagram of a flash memory system.

FIG. 5 shows a block diagram of a flash memory system 560 which may include a flash memory array 540, which may be the memory array 440 of FIG. 4, a memory controller 550, and a cache memory 555. The flash memory array 540 may include a plurality of data banks 510 and a parity bank 520. Each of the data banks 510 and the parity bank 520 may include n flash memory planes, where n may be one or more. To facilitate logical organization of the memory addresses, n may preferably be a power of 2. Each row 1, 2, 3 . . . n, of the memory array 540 may form a parity subsystem which functions as described in conjunction with FIG. 2. Each flash memory plane (D0,0 . . . Pn) may be connected to the memory controller 550 by a data bus within a plurality of data buses 545. In cases where plural memory planes are disposed within a single chip or package, pairs or groups of memory planes may share the same data bus connection with the memory controller 550. Each of the plurality of data buses 545 may be a bidirectional bus or opposing unidirectional busses for reading and writing data to the memory array 540.

The memory controller 550 may be adapted to control reading from, writing to, and erasing the memory array 540. The memory controller 550 may include a bus interface unit 551 to send and receive data, address, and control signals to and from the memory array 540 over the plurality of data buses 545. The memory controller may include a client interface 552 to exchange data with and receive requests from a client device 570 over a client communications link 575. The client device 570, which is not a part of the memory system 560, may be a processor, an audio/video player, or other device that reads data from and writes data to the memory system 560. The client communications link may be a bus such as a USB bus, a Fibre Channel bus, a SCSI bus, a SAS bus, a SATA bus, a PCI Express bus, a PCI bus, a proprietary bus, or some other communications link.

When the client device 570 requests data to be read from or written into the memory system 560, a request execution unit 553 within the controller 550 may translate the request into appropriate memory address and control signals to perform the requested function. The request execution unit 553 may also convert a data format used to communicate via the client communications link 575 to the data format required to transfer data to or from the flash memory array 540 over the plurality of buses 545. The request execution unit 553 may cause data being read from or stored into the flash memory array 540 to be temporarily stored in the cache memory 555. The controller 550 may include parity logic 554 to calculate parity information for data to be stored in the flash memory array 540.

The request execution unit 553 may include a mapping function that relates each page in the data memory planes (D0,0 . . . Dn,3) to a parity group and thus to other members of the same parity group. The request execution unit 553 may manage write and erase operations such that the parity data stored in the parity planes P0-Pn is current and accurate. The request execution unit 553, in conjunction with the parity logic 554, may also reconstruct data pages that cannot be read from one or more memory planes that are occupied with a write or erase operation from data and parity information read from unoccupied members of the same parity group.

The controller 550 may include hardware and/or firmware for providing functionality and features described herein. The processes, functionality and features may be embodied in whole or in part in firmware which operates on a processor. The hardware and firmware and their functions may be distributed such that some components are performed by the controller 550 and others by other devices. The controller 550 may therefore include one or more of: logic arrays, memories, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the controller 550 may include various specialized units, circuits, and interfaces for providing the functionality and features described here.

Figure 6:
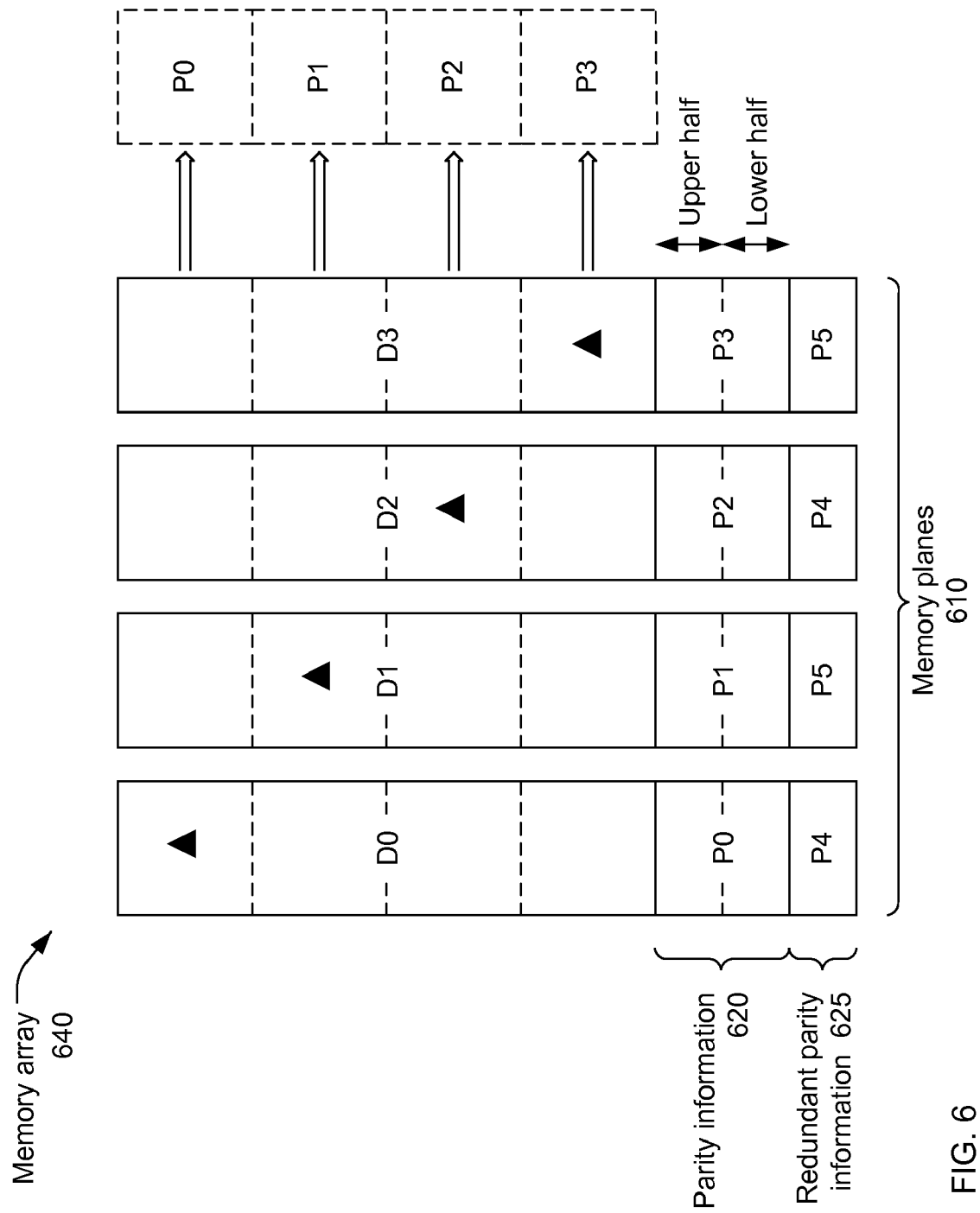
FIG. 6 is a block diagram of a flash memory system.

FIG. 6 is a block diagram of a memory array 640 which store parity information and data within the same memory planes. In the example of FIG. 6, the memory array 640 includes four memory planes 610, although more or fewer memory planes could be used. Each of the memory planes 610 may have a data memory area D0, D1, D2, D3, a portion 620 for storing parity information, and a portion 625 for storing redundant parity information.

Parity information may be calculated from the data stored in the memory array as previously described in conjunction with FIG. 3. However, the parity information may be divided into portions P0, P1, P2, P3 which are stored within the memory planes 610 as opposed to being stored in a separate parity plane as shown in FIG. 2 and FIG. 4. In the example of FIG. 6, for easing of illustration, each parity portion P0-3 is shown as the parity information for a contiguous portion of the memory planes 610. Other organizations may be used. For further example, each parity portion P0-3 may be the parity information for every fourth page of the memory planes 610.

Storing the parity information P0-P3 within the memory planes 610 is not sufficient to ensure that all of the data can be read or reconstructed at any time. Specifically, when any of the memory planes is occupied with a write or erase operation, the portion of the data within that plane marked with the symbol ▲ cannot be reconstructed, since the parity information for portion marked with the ▲ is stored within the occupied plane.

To ensure the capability of reconstructing any data from an occupied memory plane, redundant parity information may also be stored in the memory planes. For example, in a memory array with four planes, redundant parity information P4 may be an exclusive OR of parity information stored in the upper halves of P0, P1, P2, and P3, and redundant parity information P5 may be an exclusive OR of parity information stored in the lower halves of P0, P1, P2, and P3. The redundant parity information P4 and P5 may each be stored in two of the memory planes, such that both P4 and P5 can be read when any of the memory planes is occupied with a write or erase operation. In this example, a parity group includes corresponding pages in each of the data memory areas D0, D1, D2, D3, and an associated page from one of the parity memory areas P0, P1, P2, P3.

The redundant parity information P4-5 may be used to reconstruct the parity data P0-3 from an occupied memory plane when necessary. For example, assume that a request to read a page of data from the upper portion of data portion D0 is received while the memory plane containing data portion D0 is occupied with a write or erase operation. In this case, two members (the data page in data memory area P0 and the parity page in memory area P0) of the parity group are occupied by the same write or erase operation. However, the parity page in memory area P0 may be reconstructed from corresponding pages in parity memory areas P1, P2, P3 and a page of redundant parity information from memory area P4 or P5. The data page from the occupied memory bank may then be reconstructed from the reconstructed parity page and the other members of the parity group.

Description of Processes

Figure 7:
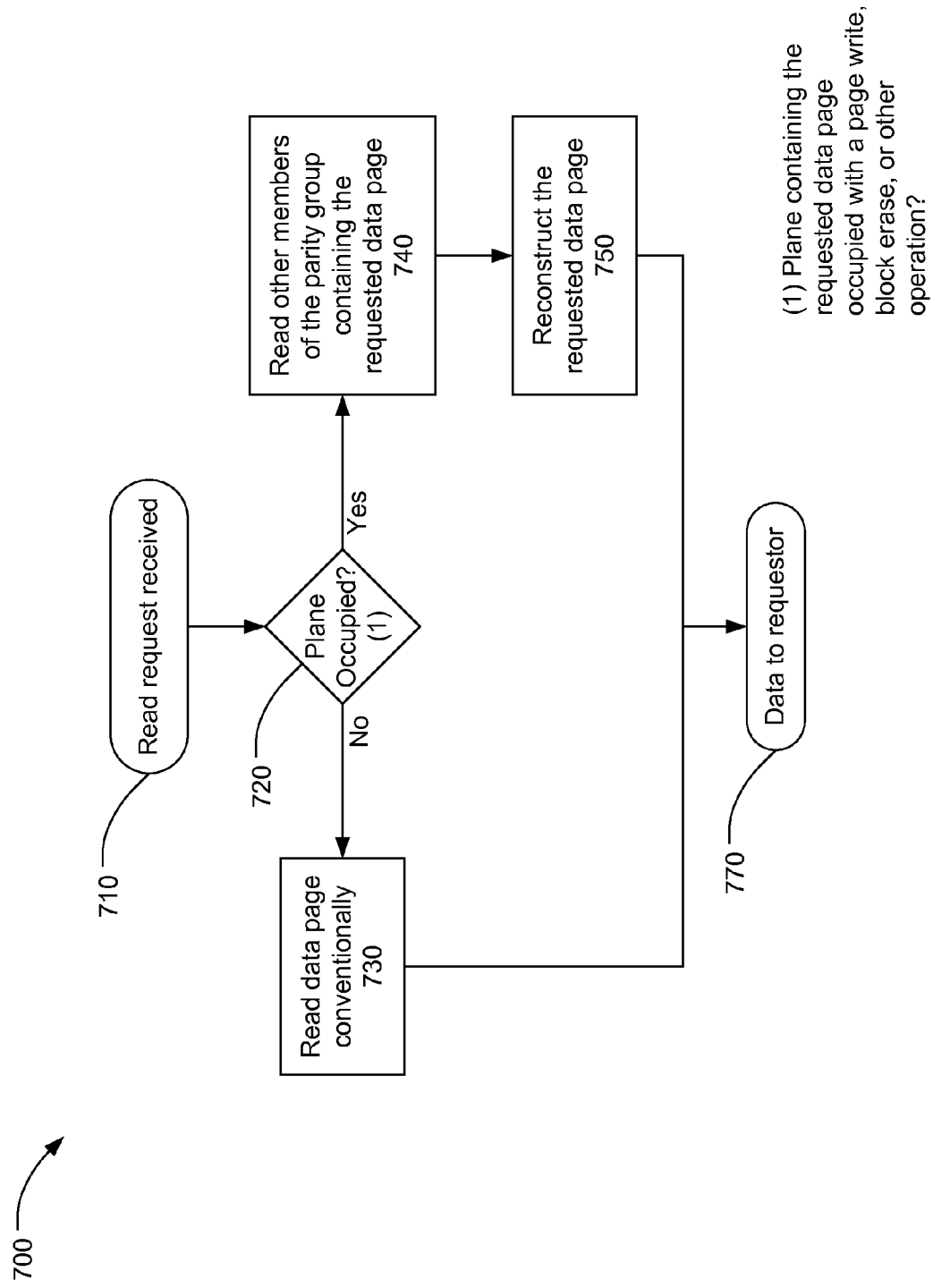
FIG. 7 is a flow chart of a memory read process.

FIG. 7 shows a flow chart of a process 700 for reading a flash memory system, which may be the flash memory systems 440 or 640 of FIG. 4 and FIG. 6, respectively, which includes a plurality of flash memory banks for storing data and parity information. Each of the flash memory banks may include one or more planes of flash memory. The process 700 may begin at 710 when a read request is received. The read request may include address information specifying a page that is to be read.

At 720, a determination may be made if the plane containing the specified page is occupied with a write or erase operation. If the plane containing the specified page is not occupied, the specified page of data may be read at 730 using a conventional flash memory read operation. For example, the page address and a read command may be provided to the appropriate plane via an input bus, the data page may be loaded into an input/output registers associated with the memory plane, and the data page may be transmitted from the input/output register via an output bus.

If a determination is made at 720 that the plane containing the specified page is occupied, the other members (pages of data and parity information) of a parity group containing the specified page may be read from other, unoccupied, planes at 740. Each of the other members of the parity group may be read using a conventional flash memory read operation as previously described. Each of the planes within the flash memory system may have independent input and output buses, in which case the other members of the parity group may be read simultaneously. Some or all of the planes within the flash memory system may share common input and output buses, in which case all or portions of the other members of the parity group may be read consecutively.

After the members of the parity group have been read from the unoccupied planes of flash memory at 740, the requested data may be reconstructed at 750. The requested data may be reconstructed by calculating parity information across the pages in the parity group. The requested data, either read to 730 or reconstructed at 750, may be provided to the requestor at 770, ending the read process 700.

Figure 8:
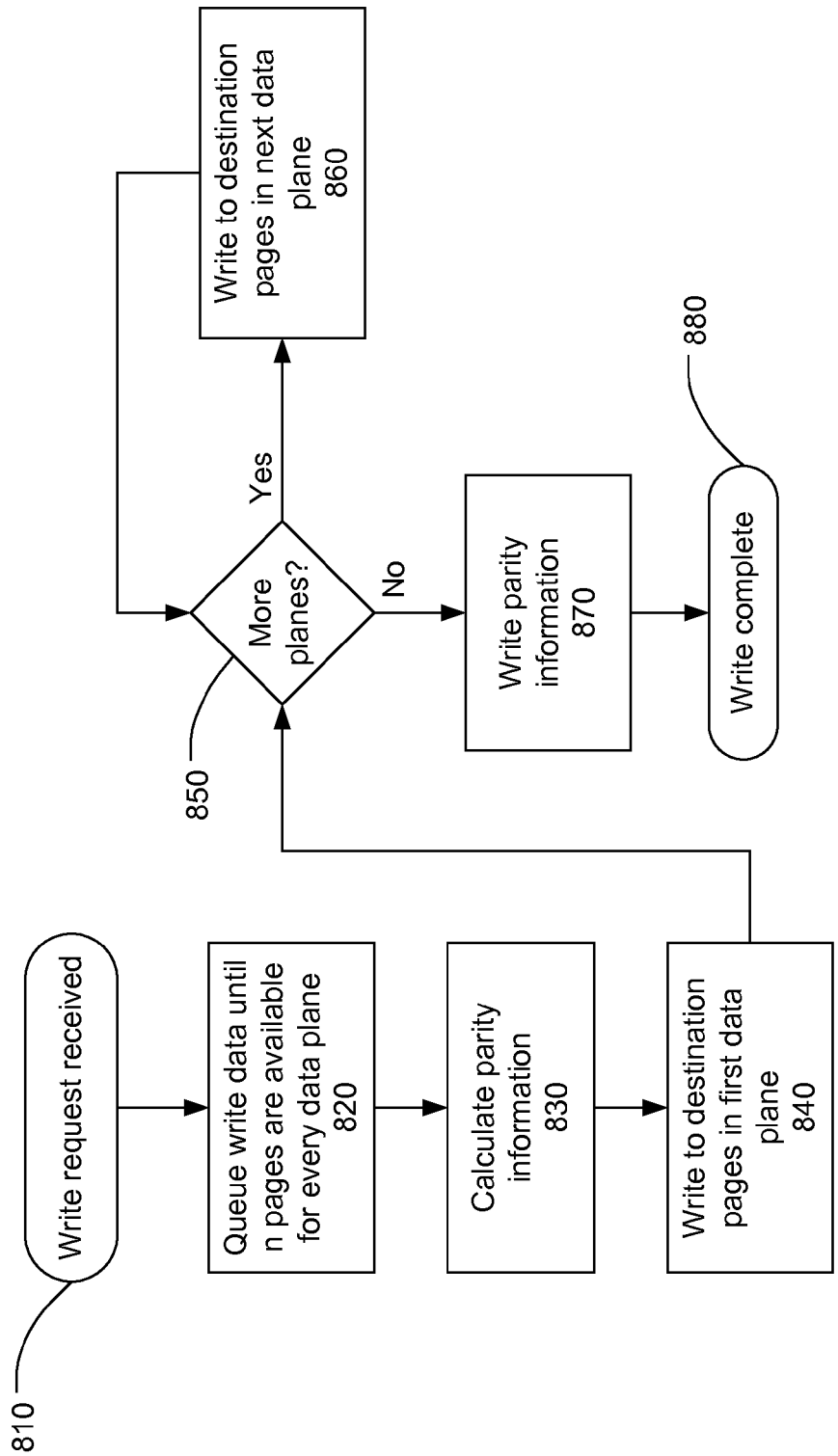
FIG. 8 is a flow chart of a memory write process.

FIG. 8 shows a flow chart of a process 800 for writing data to a flash memory system, which may be the flash memory systems 440 or 640 of FIG. 4 and FIG. 6, respectively, which includes a plurality of flash memory banks for storing data and parity information. Each of the flash memory banks may include one or more planes of flash memory. The process 800 may begin at 810 when a write request is received. The write request may include address information specifying one or more pages to be written.

At 820, the data to be written may be queued by storing the data temporarily in a cache memory or other memory until a page of data is available for each data-page member of a parity group. Data to be written may be queued until data pages are available for n parity groups, where n is an integer greater than one. When all data-page members of a parity group are available, parity information may be calculated across the data pages at 830 as previously described.

Each of the planes within the flash memory system may have independent input/output buses, in which case it may be possible to write all of the data into the memory system simultaneously. When the data is written simultaneously, a subset or all of the entire memory system may be unavailable for read operations until the write process is completed. In the process 800, the data may be written to the memory planes consecutively. While writing consecutively may prolong the duration of the write process, any data stored in the memory system may be read concurrently with the write operation as described in conjunction with FIG. 7.

The appropriate data may be written into a first data plane at 840. The data written at 840 may be a single page of data associated with a single parity group or n pages of data associated with n parity groups. The process 800 may then loop between 850 and 860 until the appropriate data has been written into all data-page members of the parity group or groups. The parity data may then be written into the memory system at 870. The data and parity information may be written into the memory system in any order. For example, the parity information may be written after all of the data has been written, as shown in FIG. 8, or the parity information may be written before or concurrently with writing the data. After all of the data pages and the parity information have been written into the memory system, the write process 810 may terminate at 880.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A memory system, comprising
a plurality of separately accessible memory areas;
a memory controller adapted to controlling reading, writing, and erasing of the plurality of memory areas,
wherein, when any one of the data memory areas is occupied, the controller is adapted to reconstruct data stored in the one occupied data memory area by reading parity information and data stored in at least one data memory area other than the one occupied data memory area,
wherein the controller is further adapted to calculate parity information associated with a plurality of data pages to be written; to consecutively store the plurality of data pages to the respective data memory areas; to consecutively store the parity information to the respective parity memory areas; and
whereupon a write or erase operation is performed such that only one of the data memory areas or parity memory areas is occupied by the write or the erase operation at any given time.

2. The memory system of claim 1, wherein the controller is further adapted to store the plurality of data pages and the parity information as an atomic operation.

3. The memory system of claim 1, wherein each bit of the parity information is set to provide one of even parity and odd parity for corresponding bits in the plurality of data memory areas.

4. The memory system of claim 1, wherein each of the plurality of memory areas is a plane within a NAND flash memory device.

5. The memory system of claim 1, wherein the controller is coupled to each of the plurality of memory areas by one or more input/output buses.

6. The memory system of claim 5, wherein the controller is coupled to each of the plurality of memory areas by a separate input/output buss for each of the memory areas.

7. The memory system of claim 1, wherein the plurality of memory areas comprises two or more data memory areas and at least one parity memory area to store the parity information.

8. The memory system of claim 7, wherein the two or more data memory areas are four data memory areas.

9. The memory system of claim 7, further comprising
two or more parity memory areas to store multiple-bit parity information,
whereupon the write or erase operation may be performed such that two or more of the data memory areas or parity memory areas are occupied by the write or the erase operation at any given time.

10. The memory system of claim 1, wherein at least some of the plurality of memory areas store both data and parity information.

11. A memory system, comprising
a plurality of separately accessible data memory banks, each data memory bank including N data memory planes, where N is a positive integer greater than 1;
a separately accessible parity bank including N parity memory planes, wherein each of the N parity memory planes is associated with the corresponding data memory planes of the plurality of data memory banks;
a memory controller adapted to controlling reading, writing, and erasing of the plurality of data memory banks and the parity memory bank,
wherein, when anyone of the plurality of data memory banks is occupied, the controller is adapted to reconstruct data stored in the one occupied data memory bank by reading corresponding portions of the parity memory bank and the plurality of data memory banks other than the one occupied data memory bank, and
whereupon a write or erase operation may be performed such that only one of the data memory banks or parity memory banks is occupied by the write or the erase operation at any given time.

12. The memory system of claim 11, wherein the plurality of data memory banks is four data memory banks.

13. The memory system of claim 11, wherein N is a power of two.

14. A process for operating a flash memory system, comprising:
storing data in at least some of a plurality of flash memory banks;
storing parity information associated with the data in one or more of the plurality of flash memory banks;

when anyone of the flash memory banks is occupied with one of a write operation and an erase operation;

reading parity information and data stored in the plurality of memory banks other than the one occupied memory bank; and reconstructing data stored in the one occupied flash memory bank based on the parity information and data read from the plurality of memory banks other than the one occupied memory bank, whereupon the write operation or the erase operation may be performed such that only one of the data memory banks or parity memory banks is occupied by the write or the erase operation at any given time.

15. The process of claim 14, wherein each of the flash memory banks comprises two or more memory planes.

16. The process of claim 14, wherein the plurality of flash memory banks includes two or more data banks for storing data and a parity bank for storing party information.

17. The process of claim 16, wherein storing data and storing parity information comprises:

accumulating at least one page of data to be written into each of the two or more data banks;

calculating parity information from the accumulated pages of data;

writing the pages of data to the corresponding data banks consecutively; and writing the parity information to the parity bank.

18. The process of claim 17, wherein writing the pages of data and writing the parity information is atomic.

19. The process of claim 14, wherein at least some of the plurality of flash memory banks store both data and parity information, and further comprising storing redundant parity information associated with the data in one or more of the flash memory banks.

* * * * *